US007689987B2

(12) United States Patent
Neil

(10) Patent No.: US 7,689,987 B2
(45) Date of Patent: Mar. 30, 2010

(54) SYSTEMS AND METHODS FOR STACK-JUMPING BETWEEN A VIRTUAL MACHINE AND A HOST ENVIRONMENT

(75) Inventor: Mike Neil, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1555 days.

(21) Appl. No.: 10/882,504

(22) Filed: Jun. 30, 2004

(65) Prior Publication Data

US 2006/0005186 A1    Jan. 5, 2006

(51) Int. Cl.
*G06F 9/455* (2006.01)
(52) U.S. Cl. .............................. 718/1; 703/24
(58) Field of Classification Search ....................... 718/1
See application file for complete search history.

(56) References Cited

U.S. PATENT DOCUMENTS

| | | | | |
|---|---|---|---|---|
| 6,138,273 A | 10/2000 | Sturges | ............... | 717/114 |
| 7,424,710 B1 * | 9/2008 | Nelson et al. | ............... | 718/1 |
| 7,516,453 B1 * | 4/2009 | Bugnion | ............... | 718/1 |
| 2003/0074493 A1 | 4/2003 | Askar et al. | ............... | 710/8 |
| 2003/0093593 A1 | 5/2003 | Ennis | ............... | 710/36 |
| 2003/0133449 A1 | 7/2003 | Fitzpatrick et al. | ............... | 370/389 |
| 2003/0233386 A1 | 12/2003 | Waki et al. | ............... | 718/100 |

* cited by examiner

*Primary Examiner*—Meng-Ai An
*Assistant Examiner*—Eric C Wai
(74) *Attorney, Agent, or Firm*—Woodcock Washburn LLP

(57) ABSTRACT

Several embodiments of the present invention provide a means for reducing overhead and, thus, improving operating efficiency in virtualized computing systems. Certain of these embodiments are specifically directed to providing a bypass mechanism for jumping directly from a first stack in the guest operating system to a second stack in the host operating system for a virtual machine environment. More specifically, certain embodiments of the present invention are directed to a system for and method of eliminating redundancy in execution of certain virtual machine commands and executing host environment equivalents by using bypass mechanisms, thereby bypassing redundant software layers within the guest and host stacks. For some of these embodiments, the bypass mechanism operates at a high-level component of the stack or, alternatively, the bypass mechanism operates at a low-level component of the stack.

12 Claims, 9 Drawing Sheets

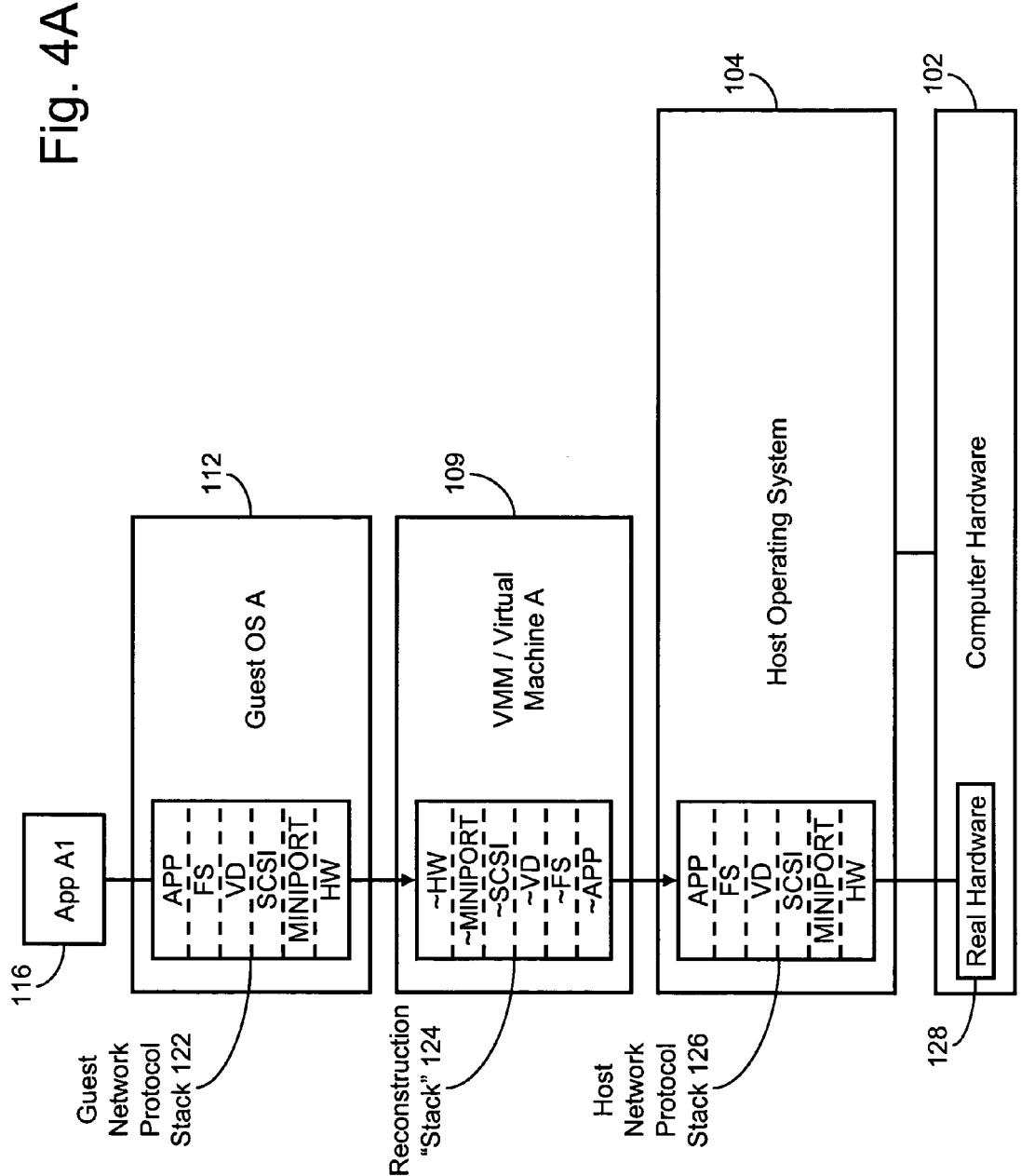

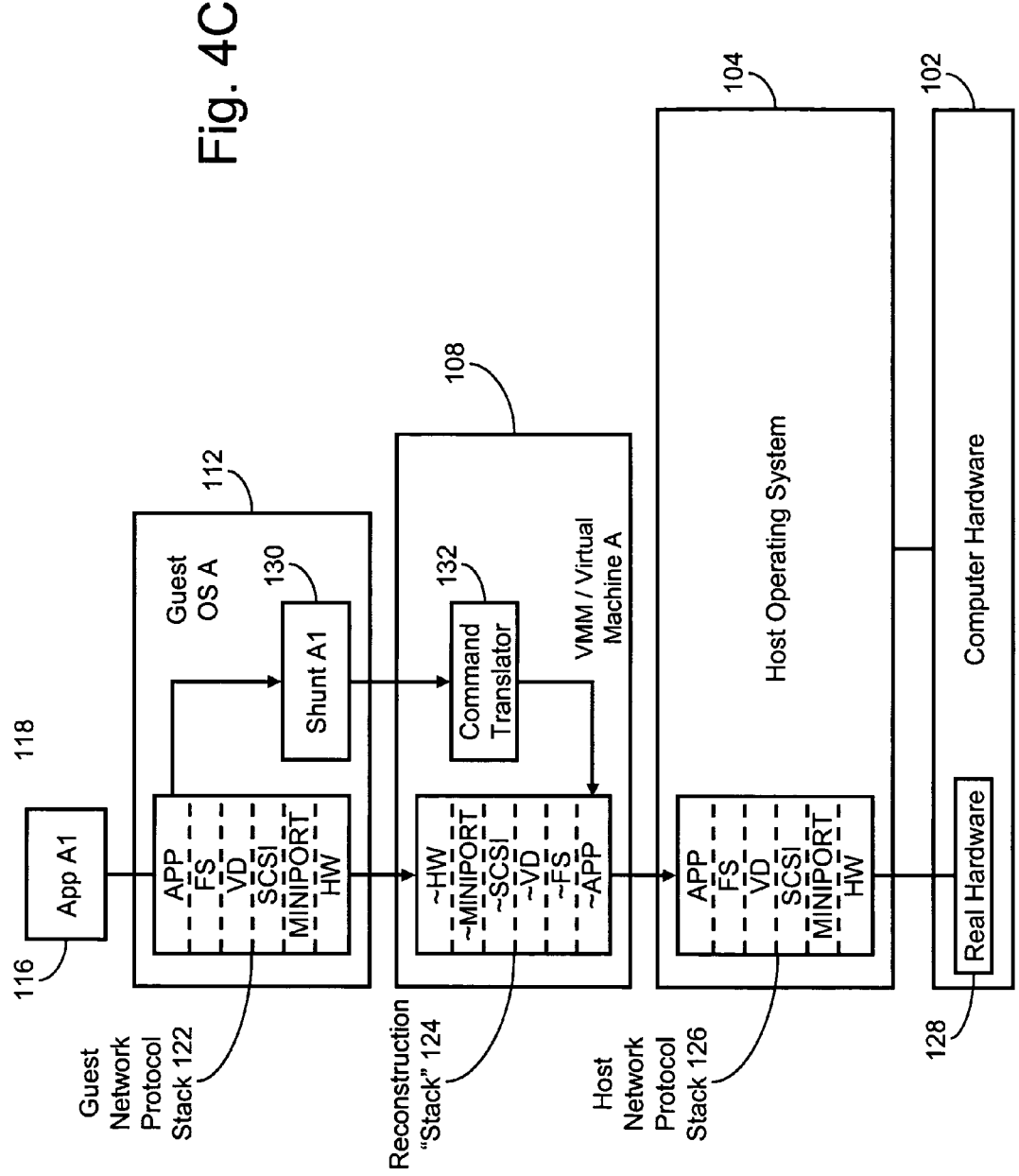

SYSTEMS AND METHODS FOR STACK-JUMPING BETWEEN A VIRTUAL MACHINE AND A HOST ENVIRONMENT

CROSS-REFERENCE

This application is related by subject matter to the inventions disclosed in the following commonly assigned application: U.S. patent application Ser. No. 10/734,450, filed on Dec. 12, 2003 and entitled "SYSTEMS AND METHODS FOR BIMODAL DEVICE VIRTUALIZATION OF ACTUAL AND IDEALIZED HARDWARE-BASED DEVICES," the entirety of which is hereby incorporated by reference herein.

FIELD OF THE INVENTION

The present invention generally relates to the field virtual machines (also known as "processor virtualization") and software that executes in a virtual machine environment. More specifically, the present invention is directed to jumping from a software stack in the virtual machine to a corresponding software stack in the host environment on which the virtual machine is executing.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Computer manufacturers want to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include an emulator program that allows the host computer to emulate the instructions of an unrelated type of CPU, called a guest. Thus, the host computer will execute an application that will cause one or more host instructions to be called in response to a given guest instruction. Thus the host computer can both run software design for its own hardware architecture and software written for computers having an unrelated hardware architecture. As a more specific example, a computer system manufactured by Apple Computer, for example, may run operating systems and program written for PC-based computer systems. It may also be possible to use an emulator program to operate concurrently on a single CPU multiple incompatible operating systems. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a "virtual machine" as the guest computer system only exists in the host computer system as a pure software representation of the operation of one specific hardware architecture. The terms emulator, virtual machine, and processor emulation are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system.

The emulator program acts as the interchange between the hardware architecture of the host machine and the instructions transmitted by the software running within the emulated environment. This emulator program may be a host operating system (HOS), which is an operating system running directly on the physical computer hardware. Alternately, the emulated environment might also be a virtual machine monitor (VMM) which is a software layer that runs directly above the hardware and which virtualizes all the resources of the machine by exposing interfaces that are the same as the hardware the VMM is virtualizing (which enables the VMM to go unnoticed by operating system layers running above it). A host operating system and a VMM may run side-by-side on the same physical hardware.

Within any computer operating system (OS), whether a host OS or guest OS, there exists one or more software stacks, each of which is a set of layered programs through which an application program may communicate to lower-level hardware. For example, software stacks typically exist for handling disk operations, video (i.e., graphics) operations, and networking operations. Within each stack, the higher-level components talk to the lower-level components and vice versa; i.e., each layer talks to the one above and below it.

An application programming interface (API) is an example of a higher-level stack component. An API is a set of routines, tools, and protocols used by software developers to write applications that are compatible with a specific operating system or interface. By contrast, a device driver is an example of a lower-level stack component. A device driver is a program that controls a particular type of peripheral device that is attached to a computer. There are device drivers for printers, displays, CD-ROM readers, diskette drives, and so on. Furthermore, several other software layers may exist between the highest and lowest levels of the software stack.

In the case of a graphics stack, for example, a 3D API is an example of a high-level component of the stack. This generic term refers to any API that supports the creation of standard 3D objects, lights, cameras, perspectives, and so on. Such APIs include Argonaut's BRender and Microsoft's Reality Lab. Beneath the 3D API in the graphics stack there may be, for example, a graphics device interface (GDI), which is the software layer that handles the interaction between application programs and the hardware of the display adapter. GDI translates a program's request to, for example, draw a line between two points into the pattern of pixel changes that the display adapter expects. Finally, the lowest-level component of the graphics stack may be, for example, a video card device driver, which is the software layer that communicates to the low-level computer hardware, i.e., the video display device, such as a computer monitor.

Continuing with the example of a graphics application, in today's virtual machine environment, the command progression is from the guest OS application, through the guest OS graphics stack to form a bitmap for the synthetic virtual graphics hardware. The VMM then receives this bitmap and reconstructs it into a graphics call for the graphics stack of the host OS. This graphics call is then passed from the VMM to the host OS and through the host OS graphics stack to form a bitmap for the physical graphics hardware.

However, in situations where the graphics stack for the guest OS and the graphics stack for the host OS are similar (or at least compatible), this through-back-through approach is three-times redundant—that is, a graphics call must travel through three essentially redundant layers, making one largely unnecessary round-trip, to finally draw the bitmap to the hardware display device. As a result, there are inefficiencies inherent in the operation of today's virtual machines, whereby much overhead is incurred by the redundant processing of commands through similar or identical guest OS and host OS software stacks. What is needed is a way to eliminate the redundant processing of commands through similar software stacks in both the guest OS and host OS to thereby achieve a more efficient virtual machine environment.

SUMMARY OF THE INVENTION

Several embodiments of the present invention provide a means for reducing overhead and, thus, improving operating efficiency in virtualized computing systems. Certain of these embodiments are specifically directed to providing a bypass mechanism for jumping directly from a guest operating system stack to a host operating system stack in order to avoid redundant through-back-through processing of a software stack command.

Certain embodiments of the present invention are directed to a system for and method of redirecting certain virtual machine software stack commands and executing host environment software stack command equivalents by using a bypass mechanisms in a virtual machine environment, thereby bypassing redundant software layers within the guest, VMM, and host stacks. In the example of a graphics stack, certain embodiments use a bypass mechanism for passing graphics commands around portions of the guest stack and directly through the VM onto the host stack. For some of these embodiments, the bypass mechanism operates at a high-level component of the stack, such as at the API level; for other embodiments, the bypass mechanism operates at a low-level component of the stack, such as at the device driver level.

Finally, several embodiments of the present invention are directed to providing a "bimodal device" according to U.S. patent application Ser. No. 10/734,450, filed on Dec. 12, 2003, entitled "SYSTEMS AND METHODS FOR BIMODAL DEVICE VIRTUALIZATION OF ACTUAL AND IDEALIZED HARDWARE-BASED DEVICES." In this regard, these bimodal devices would comprise two modes, one for optimized operation (e.g., stack jumping when available) and one for standard operations (e.g., normal processing when stack jumping is not possible).

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 4A is a block diagram that represents logical portions of the system of FIG. 3B and illustrates the inefficiency of a through-back-through redundant stack traversal for a network communications call;

FIG. 4C is a block diagram that represents the logical combination of the existing through-back-through approach of FIG. 4A with the jump-stack approach of FIG. 4B as a bimodal device implementation.

DETAILED DESCRIPTION OF ILLUSTRATIVE EMBODIMENTS

The inventive subject matter is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
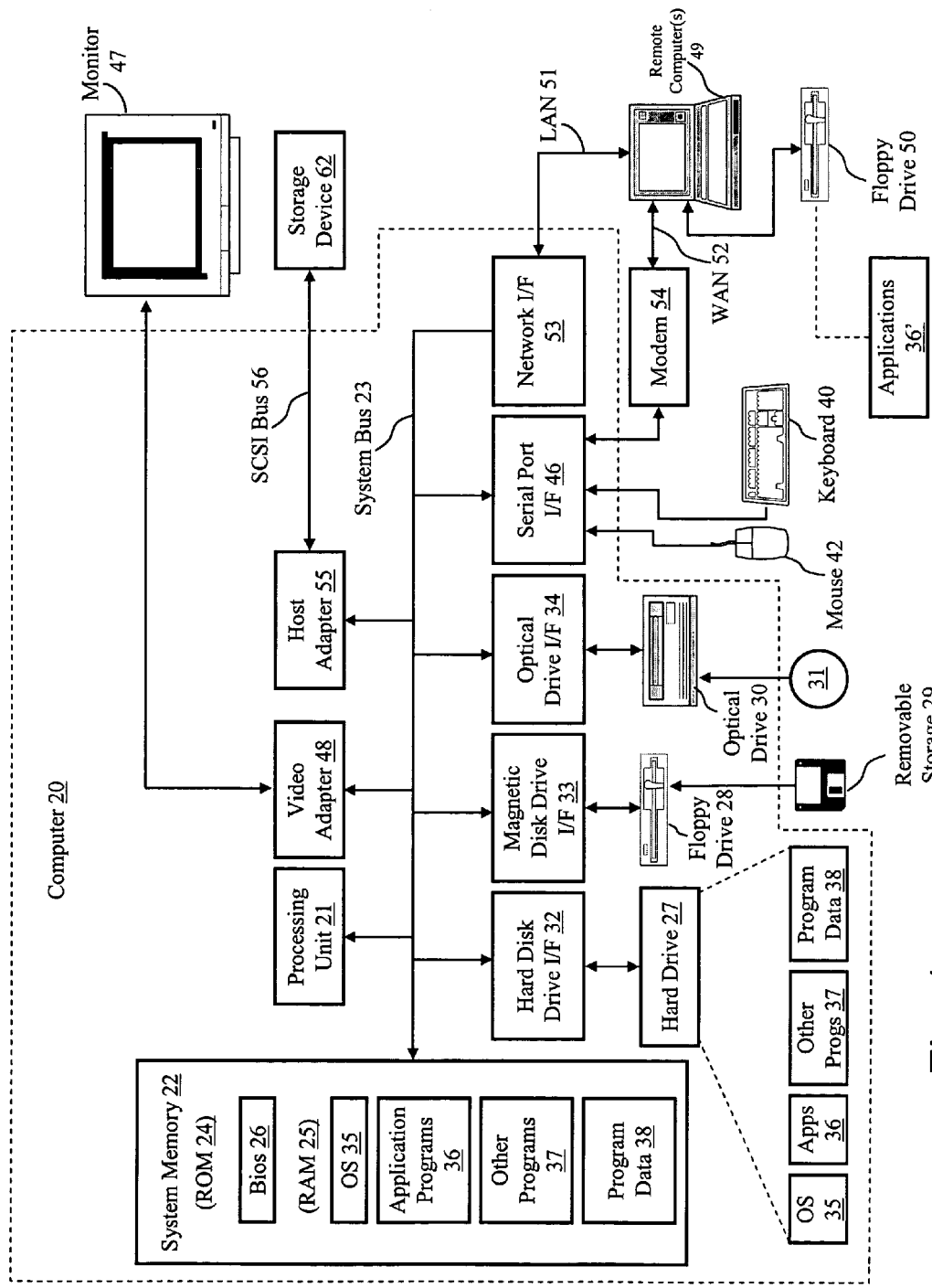
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present invention are particularly well-suited for computerized systems, nothing in this document is intended to limit the invention to such embodiments.

Virtual Machines

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that said software layers are running on their own private computer system, and thus VMs can allow multiple "guest systems" to run concurrently on a single "host system."

Figure 2:
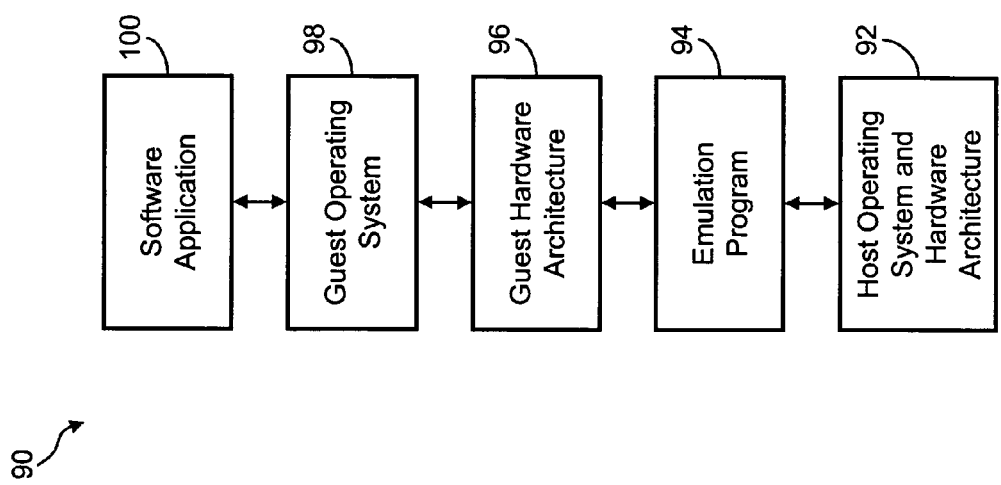
FIG. 2 illustrates the logical layering of the hardware and software architecture for an emulated operating environment in a computer system.

FIG. 2 is a diagram representing the logical layering of the hardware and software architecture for an emulated operating environment in a computer system. An emulation program 94 runs on a host operating system and/or hardware architecture 92. Emulation program 94 emulates a guest hardware architecture 96 and a guest operating system 98. Software application 100 in turn runs on guest operating system 98. In the emulated operating environment of FIG. 2, because of the operation of emulation program 94, software application 100 can run on the computer system 90 even though software application 100 is designed to run on an operating system that is generally incompatible with the host operating system and hardware architecture 92.

Figure 3A:
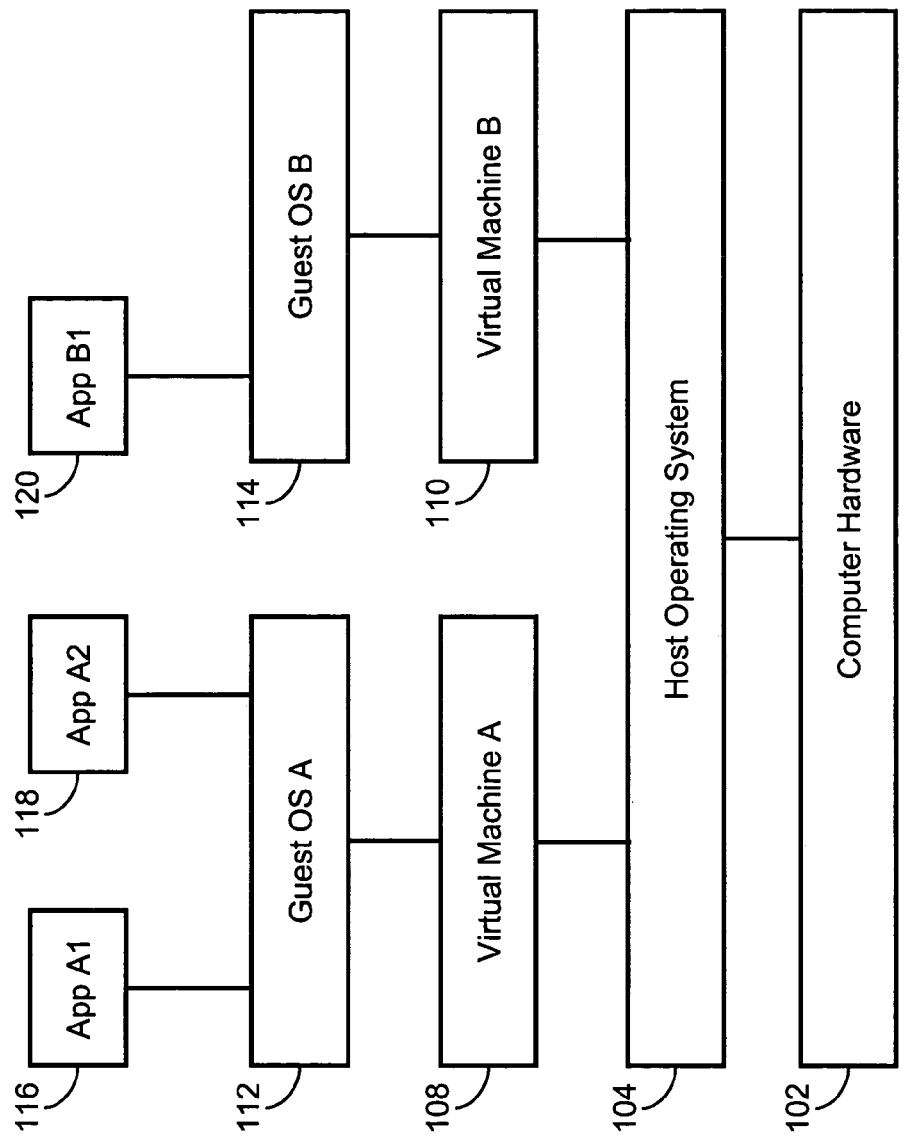
FIG. 3A illustrates a virtualized computing system.

FIG. 3A illustrates a virtualized computing system comprising a host operating system software layer 104 running directly above physical computer hardware 102, and the host operating system (host OS) 104 virtualizes all the resources of the machine by exposing interfaces that are the same as the hardware the host OS is virtualizing (which enables the host OS to go unnoticed by operating system layers running above it).

Figure 3B:
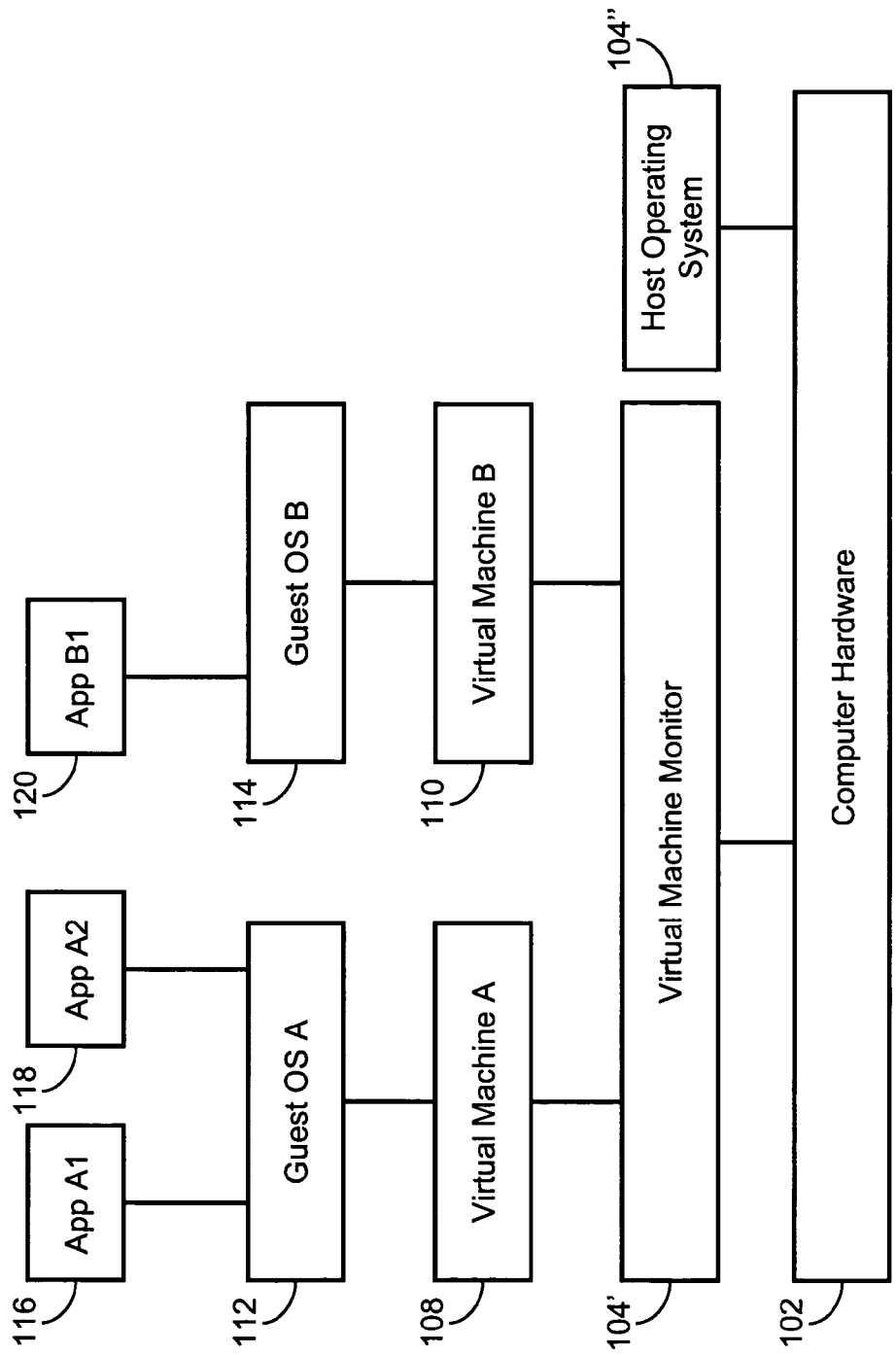
FIG. 3B illustrates an alternative embodiment of a virtualized computing system comprising a virtual machine monitor running alongside a host operating system.

Alternately, a virtual machine monitor, or VMM, software layer 104' may be running in place of or alongside a host operating system 104'', the latter option being illustrated in FIG. 3B. For simplicity, all discussion hereinafter (specifically regarding the host operating system 104) shall be directed to the embodiment illustrated in FIG. 3A; however, every aspect of such discussion shall equally apply to the embodiment of FIG. 3B wherein the VMM 104' of FIG. 3B essentially replaces, on a functional level, the role of the host operating system 104 of FIG. 3A described herein below.

Referring again to FIG. 3A, above the host OS 104 (or VMM 104') are two virtual machine (VM) implementations, VM A 108, which may be, for example, a virtualized Intel 386 processor, and VM B 110, which may be, for example, a virtualized version of one of the Motorola 680X0 family of processors. Above each VM A 108 and 110 are guest operating systems (guest OSes) A 112 and B 114 respectively. Above guest OS A 112 are running two applications, application A1 116 and application A2 118, and above guest OS B 114 is application B1 120.

Stack-Jump Progression vs. Through-Back-Through Stack Progression

Figure 4B:
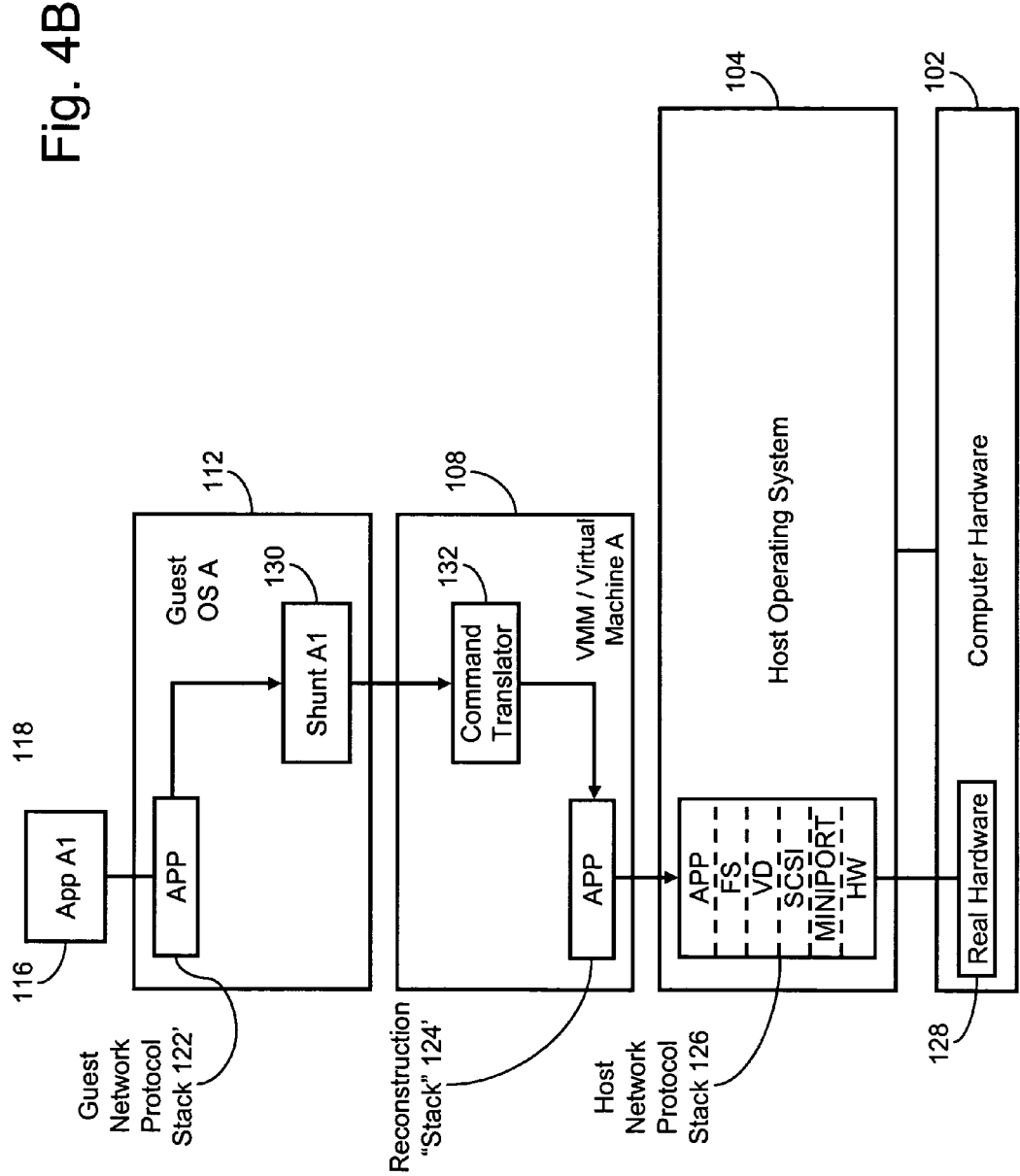
FIG. 4B is a block diagram that represents logical portions of the system of FIG. 3B and illustrates the efficiency of avoiding the through-back-through redundant stack traversal for a network communications call for several embodiments of the present invention that comprise an API-level shunt.

FIG. 4A is a block diagram that represents logical portions of the system of FIG. 3B and illustrates the inefficiency of a through-back-through redundant stack traversal for a network communications call. In the figure, host OS 104 and the guest OS A 112 further comprise exemplary network communication stacks, a.k.a., network protocol stacks 122 and 126, as well as a reconstruction stack 124 of the VMM/Virtual Machine A 109 (where, in reference to FIG. 4B, the VM A 108 is the emulated hardware for the guest OS A 112 to interact with, whereas the VMM 104' is the software component that creates the VM virtualization and which processes the commands via the host operating system 104 to execute on the physical computer hardware 102). More specifically, FIG. 4A illustrates a conventional guest network protocol stack 122 (utilized by guest application A1 116 to execute a network communications call within guest OS A 112) that further comprises several component layers (APP, FS, VD, SCSI, MINIPORT, and HW) accordingly, where the top layer (APP) comprises an application programming interface (API) and the bottom layer (HW) comprises a device driver that ostensibly communicates directly with communication hardware such as a network card (or, in this case, a virtual network card in the virtual machine component of VMM/VM A 108).

The low-level commands exiting the bottom of the guest network protocol stack 122 of guest OS A 112 subsequently pass down into a virtual network card of the virtual machine 108—that is, the VMM/VM A 109. This virtual network card, however, is in fact a reconstruction stack 124 in the VMM 104' that reconstructs the low-level commands into a high-level API commands for the host operating system's 104 network protocol stack 126. The conventional host network protocol stack 126 (utilized by the VMM 104' of VMM/VM A 109 to execute a network communications call via the host OS 104 to the real hardware 128 of the computer hardware 102) also comprises several component layers (APP, FS, VD, SCSI, MINIPORT, and HW) accordingly, where the top layer (APP) comprises an application programming interface (API) and the bottom layer (HW) comprises a device driver that communicates directly with real communication hardware 128 of the computer hardware 102.

In total, the network communication command issued by application A1 116 traveled through three versions of the network protocol stack (two conventional stacks 122 and 126 and one reconstructions stack 124). However, in situations where the guest stack 122 and the host stack 126 are compatible—for example, when the stacks used are identical—this through-back-through approach is doubly redundant.

Various embodiments of the present invention are directed to systems and methods for eliminating (or at least minimizing when possible) the through-back-through approach to stack commands. In other words, various embodiments of the present invention are directed to a methodology for efficient execution of a stack command in a virtual machine environment comprising (a) a guest operating system and one guest application running on said guest operating system, (b) a host operating system, and (c) a physical hardware computer system comprising at least one physical hardware device, the methodology comprising the bypassing of at least one layer in a guest operating system stack by shunting (redirecting) a stack command—from said guest application to (intended for) said guest operating system—to a corresponding host operating system stack.

In accordance with several such embodiments, FIG. 4B is a block diagram that represents logical portions of the system of FIG. 3B in regard to the network protocol stacks of FIG. 4A and illustrates an jump-stack (or stack-jump) approach of avoiding the through-back-through redundant stack traversal for a network communications call for several such embodiments of the present invention that comprise an API-level shunt to enable the jump-stack solution.

In the figure, host OS 104 still comprises an exemplary network communication stack, a.k.a., network protocol stacks 126, but guest OS 112 has only a truncated network protocol stack 122' comprising an API layer, and the VMM/Virtual Machine A 109 only has a truncated reconstruction stack 124' also comprising an API layer. When application A1 116 makes a high-level communication command/call to the guest OS A 112, that command is received by the API of the modified guest network protocol stack 122' but, instead of being further processed, the communication call is shunted (via shunt A1) to a command translator 132 in the VMM/VM A 109. The command translator 132 directly converts the high-level guest OS 112 communication call to a corresponding high-level host OS 104 communication call for the APP reconstruction layer of the modified reconstruction stack 124' so that the communication command is then passed from the modified reconstruction stack 124' to the host network protocol stack 126. The conventional host network protocol stack 126 that processes the communication command through the stack and then communicates directly with real communication hardware 128 of the computer hardware 102.

In total, the network communication command issued by application A1 116 traveled through only one-plus versions of the network protocol stack with only minimal overlap of communication stack layers (and corresponding reconstruction stack layers) and thus eliminates much of the redundancy.

Certain alternative embodiments of the present invention are directed to a combination approach using a bimodal device concept where both approaches—though-back-through and stack-jump—are available to the guest OS 112 and the VMM 104' such that if the stack-jump option is available it is utilized but where the standard through-back-through stack progression is still available for when the stack-jump option is not available or viable. FIG. 4C is a block diagram that represents the logical combination of the existing through-back-through approach of FIG. 4A with the jump-stack approach of FIG. 4B as a bimodal device implementation.

Figure 4D:
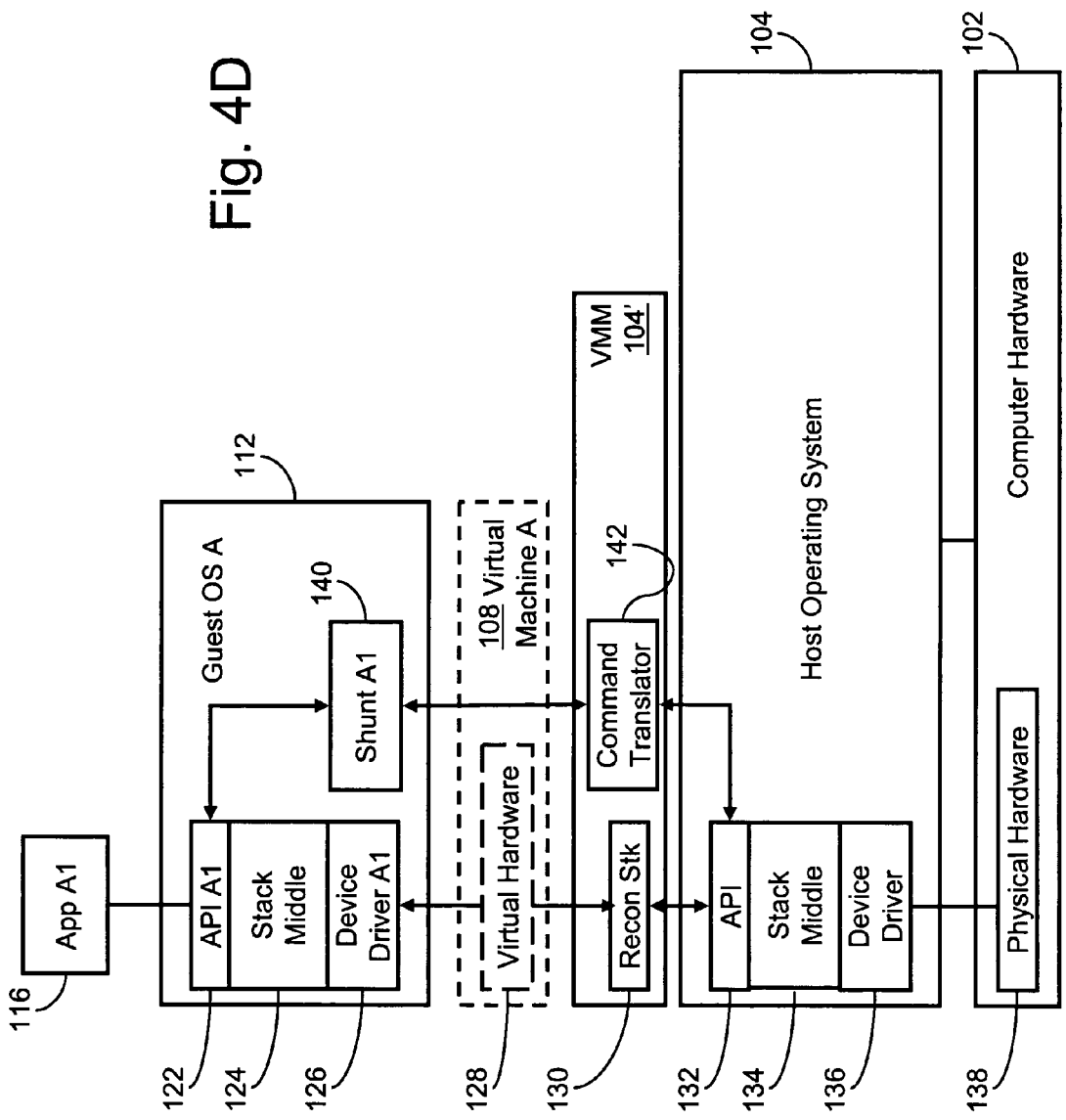
FIG. 4D is a modified block diagram that represents logical (and virtual) portions of the system of FIG. 3B and illustrates the efficiency of avoiding the through-back-through redundant stack traversal for a graphics call for several embodiments of the present invention that comprise an API-level shunt.

Of course, the stack-jumping approach, both alone and in combination with a through-back-through approach in a bimodal device, is not limited to a communications stack but could be employed for any stack structure or any other structure where bypassing redundant portions of code is both possible and desirable. FIG. 4D is a modified block diagram that illustrates the logical (and virtual) portions of a general system employing a bimodal device approach to reducing redundancy for any stack structure or any other structure where bypassing redundant portions of code is both possible and desirable.

As previously mentioned in regard to FIGS. 4A-4D, command translator 142 of VM A 108 is optional and is needed, for example, if guest OS A 112 is a different operating system type from host OS 104 and, thus, has differing syntax and semantics within its API calls, which consequently require translation from one operating system type to another. However, in the case in which the operating systems are the same between guest OS A 112 and host OS 104, no translation operation may be needed; thus, the API calls from API AI 122 may passed directly through VM A 108 and into host OS 104 without using command translator 142.

As shown in FIGS. 4B-4D, shunt A1 140 and, optionally, command translator 142, provide a mechanism for bypassing redundant software layers within guest OS A 112 and host OS 104 and thereby provide greater efficiency in a virtual machine environment. For example, GDI A1 124 and device driver A1 126 of guest OS A 112 and virtual video card 128 and bitmap 130 of VM A 108 are bypassed. As a result, the complex translation operation that typically takes place in the host environment for translating the guest OS constructs to host OS constructs is avoided. The virtualized computing system of FIG. 4 eliminates this complex translation and allows the guest OS constructs to be mapped very easily to the host OS constructs and, thus, directly into the host OS stack. Also, in certain embodiments of the invention, the guest OS must be aware that the shunt is part of the API. Therefore, the guest OS must be modified (rewritten) to accommodate the functionality of the shunt technology (akin to a bimodal device).

Figure 5:
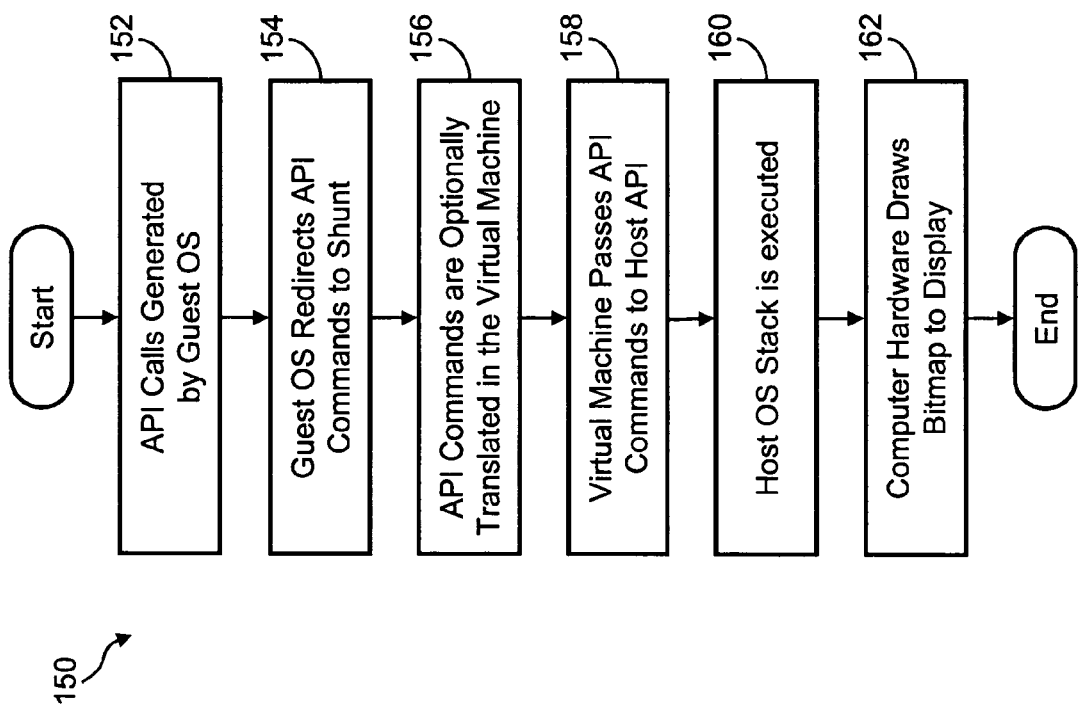
FIG. 5 is a flowchart that illustrates a method of using an API-level shunt for bypassing redundant software stack layers that reside within the guest and host OSes.

FIG. 5 is a flowchart that illustrates a method 150 of using an API-level shunt for bypassing redundant software stack layers between the guest and host OSes, as described in FIG. 4. At step 152, the method first comprises initiating application A1 116 of guest OS 112 and thereby causes API calls to be generated by API A1 122 within guest OS 112. At step 154, guest OS 112 traps the API calls from API A1 122 and redirects the commands to shunt A1 140. At step 156, shunt A1 140 captures the commands and passes them into command translator 142 of VM A 108, where, if necessary, command syntax and semantics are converted from one OS type to another OS type. At step 158, command translator 142 of VM A 108 pushes the commands directly into API 132 of host OS 104. At step 160, the host OS stack is executed, i.e., the commands pass from API 132 down to GDI 134 and then down to device driver 136. At step 162, device driver 136, at the bottom of the host stack, feeds the low-level hardware commands to video card 138 of computer hardware 102, which renders the bitmap for display upon a display device, such as a computer monitor. Furthermore, while the system and method of FIGS. 4 and 5, respectively, illustrate a graphics stack application, the present invention is equally applicable to any other applications that use a stack, such as disk or networking applications.

In addition to (or to supplement and expand) the foregoing, the virtualized computing systems of FIGS. 4B-4D are further representative of specific embodiments of a "bimodal devices" (discussed earlier herein) that combine the relative strengths of the hardware and idealized device virtualization approaches while also mitigating their respective weaknesses. In certain embodiments the bimodal device is a virtual device that is primarily based on a real piece of hardware in order to provide a broad degree of compatibility with software running in the guest environment (similar to the hardware device virtualization approach). However, to overcome the problem of poor performance that is sometimes associated with hardware virtual devices, these embodiments also provide an idealized "high-performance mode" that is not found in the original hardware-based device.

For certain other embodiments, a bimodal device implementation of the invention comprises said bimodal device making a determination of whether said guest OS is running on a virtual machine and, if so, executing the stack-jump (shunted) approach or, if not, executing the conventional approach. For certain other embodiments, a bimodal device implementation of the invention comprises said bimodal device first attempting the stack-jump (shunted) approach and, if not successfully, proceeding with executing the conventional approach. In certain other embodiments, the bimodal device may comprise the device layer of the stack, the device driver layer of the stack, or another layer from the middle of the stack of the guest operating system.

For certain specific embodiments, software drivers (and other software) developed for interaction with the original hardware device and which are unaware of (and unable to use) the high-performance mode will continue to use the "legacy mode" (hardware virtualization), while enhanced versions of guest software will be able to recognize and utilize the high-performance mode (idealized virtualization).

In addition to the various embodiments of the present invention that are directed to shunting a stack command from an application programming interface (API) layer of a guest operating system stack to a corresponding API layer of a host operating system stack (either directly or indirectly via components of the VMM to facilitate this shunting), certain alternative embodiments of the present invention are directed to shunting stack commands from a device driver layer of a guest operating system stack to a corresponding API layer of a host operating system stack (again, either directly or indirectly via components of the VMM to facilitate this shunting).

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of synthetic instructions for purposes other than processor virtualization are also anticipated by the disclosures made herein, and any such utilization of synthetic instructions in contexts other than processor virtualization should be most broadly read into the disclosures made herein.

What is claimed:

1. A method, comprising:
   executing a virtual machine, the virtual machine including a bimodal device, the bimodal device including a high-performance mode of operation and an emulation mode of operation, the emulation mode of operation configured to emulate a network card, the virtual machine executing a guest operating system, the guest operating system including a guest operating system network protocol stack for the bimodal device, the guest operating system network protocol stack including at least an application program interface and a device driver for the bimodal device;
   receiving, by the guest operating system network protocol stack, a guest application program interface construct indicative of a request to send information via the bimodal device;
   intercepting, while in the high-performance mode, the guest application program interface construct at the application program interface of the guest operating system network protocol stack;
   translating the intercepted guest application program interface construct into a corresponding host application program interface construct for a host operating system network protocol stack, the network protocol stack configured to generate commands for a physical network card;
   generating, by the host operating system network protocol stack, a request to send the information via the physical network card from the host application program interface construct; and
   sending, by the physical network card, the information.

2. A method, comprising:
   executing a virtual machine, the virtual machine including a bimodal device, the virtual machine executing a guest operating system, the guest operating system including a guest operating system network protocol stack for the bimodal device, wherein the bimodal device includes a high-performance mode of operation and an emulation mode of operation, the emulation mode of operation configured to emulate a physical device;

receiving, by the guest operating system network protocol stack, a request to send information via the bimodal device;

determining, by the bimodal device, that the guest operating system is executing in the virtual machine and selecting the high-performance mode of operation;

intercepting, while in the high-performance mode, the request at an application programming interface of said guest operating system network protocol stack and bypassing at least a portion of the guest operating system network protocol stack by sending the request to a host operating system network protocol stack for a physical network card; and sending, by the physical network card, the information.

3. The method of claim 2 wherein said intercepting the request further comprises:

intercepting the request at a device driver of said guest operating system network protocol stack.

4. The method of claim 2 further comprising:

translating the request received by the guest operating system network protocol stack into a request consumable by the host operating system network protocol stack for the physical network card.

5. A system, comprising:

a processor coupled to a computer readable storage medium, the computer readable storage medium including:

instructions for executing a virtual machine, the virtual machine including a bimodal device, the bimodal device including a high-performance mode of operation and an emulation mode of operation, the emulation mode of operation configured to emulate a network card, the virtual machine executing a guest operating system, the guest operating system including a guest operating system network protocol stack for the bimodal device, the guest operating system network protocol stack including at least an application program interface and a device driver for the bimodal device;

guest operating system network protocol stack instructions for receiving a guest application program interface construct indicative of a request to send information via the virtual network card;

instructions for intercepting, while in the high-performance mode, the guest application program interface construct at the application program interface of the guest operating system network protocol stack;

instructions for translating the intercepted guest application program interface construct into a corresponding host application program interface construct for a host operating system network protocol stack, the network protocol stack configured to generate commands for a physical network card;

host operating system network protocol stack instructions for generating a request to send information via the physical network card from the host application program interface construct; and instructions for sending, by the physical network card, the information.

6. A system, comprising:

a processor coupled to a computer readable storage medium, the computer readable storage medium including:

instructions for executing a virtual machine, the virtual machine including a bimodal device, the virtual machine executing a guest operating system, the guest operating system including a guest operating system network protocol stack for the bimodal device, wherein the bimodal device includes a high-performance mode of operation and an emulation mode of operation, the emulation mode of operation configured to emulate a physical device;

the guest operating system network protocol stack including instructions for receiving a request to send information via the bimodal device;

the bimodal device including instructions for determining that the guest operating system is executing in the virtual machine and selecting the high-performance mode of operation;

the bimodal device including instructions for intercepting, while in the high-performance mode, the request at an application programming interface of said quest operating system network protocol stack and bypassing at least a portion of the guest operating system network protocol stack by sending the request to a host operating system network protocol stack for a physical network card; and instructions for sending, by the physical network card, the information.

7. The system of claim 6 wherein the instructions for intercepting the request further comprise:

instructions for intercepting the request at a device driver of said guest operating system network protocol stack.

8. The system of claim 6 further comprising:

instructions for translating the request received by the guest operating system network protocol stack into a request consumable by the host operating system network protocol stack for the physical network card.

9. A computer-readable storage medium including computer-readable instructions, the computer-readable storage medium comprising:

instructions for executing a virtual machine, the virtual machine including a bimodal device, the bimodal device including a high-performance mode of operation and an emulation mode of operation, the emulation mode of operation configured to emulate a network card, the virtual machine executing a guest operating system, the guest operating system including a guest operating system network protocol stack for the bimodal device, the guest operating system network protocol stack including at least an application program interface and a device driver for the bimodal device;

guest operating system network protocol stack instructions for receiving a guest application program interface construct indicative of a request to send information via the virtual network card;

instructions for intercepting, while in the high-performance mode, the guest application program interface construct at the application program interface of the guest operating system network protocol stack;

instructions for translating the intercepted guest application program interface construct into a corresponding host application program interface construct for a host operating system network protocol stack, the network protocol stack configured to generate commands for a physical network card;

host operating system network protocol stack instructions for generating a request to send information via the physical network card from the host application program interface construct; and instructions for sending, by the physical network card, the information.

10. A computer-readable storage medium including computer-readable instructions, the computer-readable storage medium comprising:
- instructions for executing a virtual machine, the virtual machine including a bimodal device, the virtual machine executing a guest operating system, the guest operating system including a guest operating system network protocol stack for the bimodal device, wherein the bimodal device includes a high-performance mode of operation and an emulation mode of operation, the emulation mode of operation configured to emulate a physical device;
- instructions for the guest operating system network protocol stack including instructions for receiving a request to send information via the bimodal device;
- instructions for the bimodal device including instructions for determining that the guest operating system is executing in the virtual machine and selecting the high-performance mode of operation;
- the instructions for the bimodal device including instructions for intercepting, while in the high-performance mode, the request at an application programming interface of said guest operating system network protocol stack and bypassing at least a portion of the guest operating system network protocol stack by sending the request to a host operating system network protocol stack for a physical network card; and
- instructions for sending, by the physical network card, the information.

11. The computer-readable instructions of claim 10 wherein the instructions for intercepting the request further comprise:
- instructions for intercepting the request at a device driver of said guest operating system network protocol stack.

12. The computer-readable instructions of claim 10 further comprising:
- instructions for translating the request received by the guest operating system network protocol stack into a request consumable by the host operating system network protocol stack for the physical network card.

* * * * *